United States Patent
Hou

(10) Patent No.: US 9,727,233 B2
(45) Date of Patent: Aug. 8, 2017

(54) TOUCH DEVICE AND CONTROL METHOD AND METHOD FOR DETERMINING UNLOCKING THEREOF

(71) Applicant: Wistron Corporation, New Taipei (TW)

(72) Inventor: Chia-Chang Hou, New Taipei (TW)

(73) Assignee: Wistron Corporation, New Taipei (TW)

( * ) Notice: Subject to any disclaimer, the term of this patent is extended or adjusted under 35 U.S.C. 154(b) by 254 days.

(21) Appl. No.: 14/504,429

(22) Filed: Oct. 2, 2014

(65) Prior Publication Data

US 2016/0034172 A1 Feb. 4, 2016

(30) Foreign Application Priority Data

Jul. 30, 2014 (TW) .............................. 103125989 A

(51) Int. Cl.
*G06F 3/042* (2006.01)
*G06F 3/0488* (2013.01)

(52) U.S. Cl.
CPC ........ *G06F 3/04883* (2013.01); *G06F 3/0421* (2013.01); *G06F 3/0425* (2013.01)

(58) Field of Classification Search
CPC ... G06F 3/04883; G06F 3/0421; G06F 3/0425
See application file for complete search history.

(56) References Cited

U.S. PATENT DOCUMENTS

2006/0010400 A1* 1/2006 Dehlin .................. G06F 3/0354
715/856
2006/0075250 A1* 4/2006 Liao .................. H04M 1/72519
713/182

(Continued)

FOREIGN PATENT DOCUMENTS

| CN | 102778950 | 11/2012 |
|---|---|---|
| TW | 201030581 | 8/2010 |
| WO | 2014052895 | 4/2014 |

OTHER PUBLICATIONS

Ian Maxwell, "An Overview of Optical-Touch Technologies," Dec. 2007, Information Display, pp. 26-30.*

(Continued)

*Primary Examiner* — Dino Kujundzic
(74) *Attorney, Agent, or Firm* — Jianq Chyun IP Office

(57) ABSTRACT

A touch device and a control method and a method for determining unlocking thereof are provided. The touch device includes image capturing units configured nearby a touch surface respectively, and light-reflected objects are configured around the touch surface. In this method, the image capturing units are used to detect a reflected signal to receive a first gesture on the touch surface when the touch device is operated in a touch-lock mode. The image capturing units emit a detecting signal along the touch plane and detect the reflected signal reflected from the detecting signal. It is determined whether the first gesture matches a first specific gesture. When the first gesture matches the first specific gesture, the touch device is operated in a touch-on mode. Touch information is provided when the touch device is operated in the touch-on mode but not provided when the touch device is operated in the touch-lock mode.

13 Claims, 7 Drawing Sheets

(56) References Cited

U.S. PATENT DOCUMENTS

| | | | |
|---|---|---|---|
| 2008/0165255 A1* | 7/2008 | Christie | G06F 3/04883 348/207.99 |
| 2008/0168403 A1* | 7/2008 | Westerman | G06F 3/04883 715/863 |
| 2008/0278455 A1* | 11/2008 | Atkins | G06F 3/04883 345/173 |
| 2010/0328243 A1* | 12/2010 | Wang | G06F 3/0423 345/173 |
| 2011/0163998 A1* | 7/2011 | Goertz | G06F 3/0416 345/175 |
| 2011/0169780 A1* | 7/2011 | Goertz | G06F 3/0416 345/175 |
| 2012/0293454 A1* | 11/2012 | Tsai | G06F 3/0416 345/174 |
| 2013/0069897 A1* | 3/2013 | Liu | G06F 3/0488 345/173 |
| 2013/0086673 A1* | 4/2013 | Putterman | G06F 21/316 726/19 |
| 2013/0120319 A1* | 5/2013 | Givon | G06F 3/0425 345/175 |
| 2013/0127706 A1* | 5/2013 | Hsu | H04M 1/67 345/156 |
| 2014/0298672 A1 | 10/2014 | Straker et al. | |
| 2016/0062549 A1* | 3/2016 | Drumm | G06F 3/0421 345/175 |

OTHER PUBLICATIONS

"Introducing the NextWindow 1900 Optical Touch Screen: A NextWindow White Paper," 2007, pp. 1-11.*

"Office Action of Taiwan Counterpart Application" with English translation, issued on Oct. 8, 2015, p. 1-p. 12.

* cited by examiner

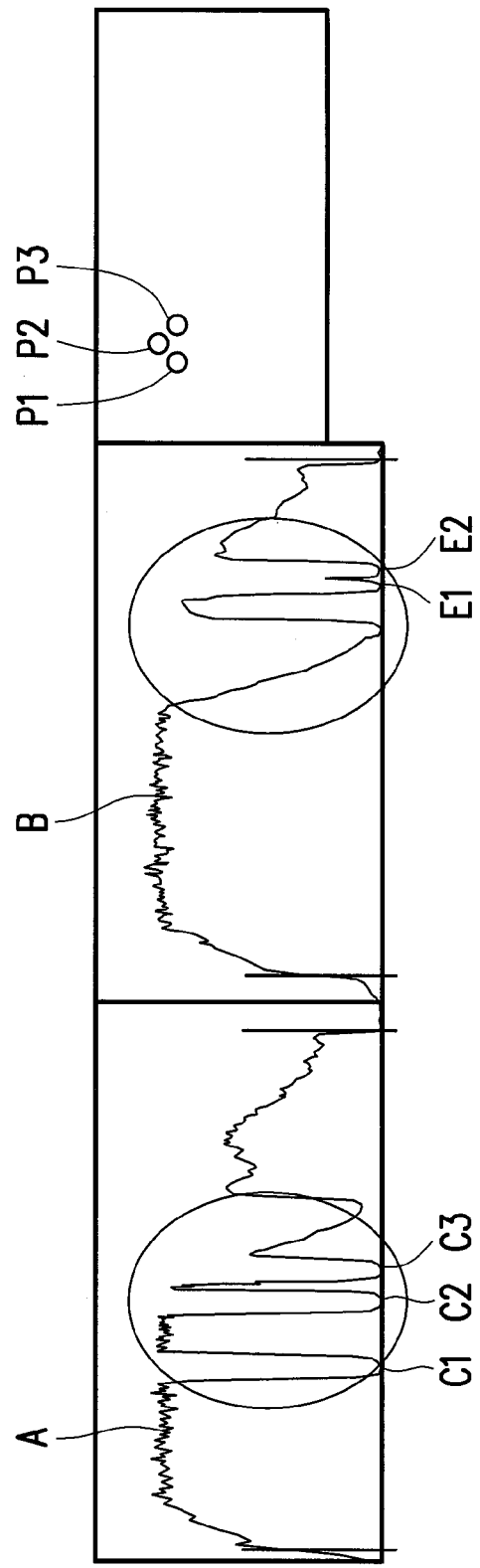

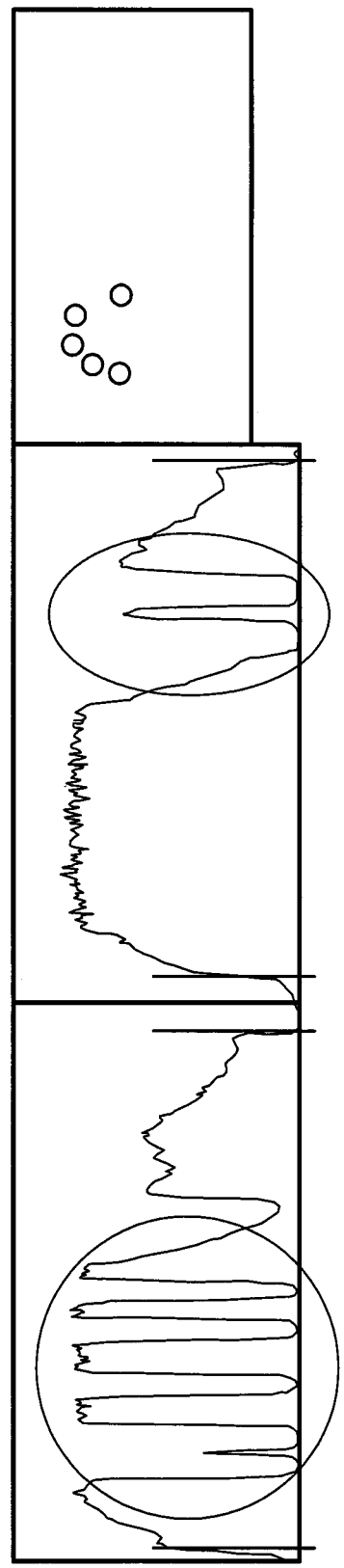

TOUCH DEVICE AND CONTROL METHOD AND METHOD FOR DETERMINING UNLOCKING THEREOF

CROSS-REFERENCE TO RELATED APPLICATION

This application claims the priority benefit of Taiwan application serial no. 103125989, filed on Jul. 30, 2014. The entirety of the above-mentioned patent application is hereby incorporated by reference herein and made a part of this specification.

BACKGROUND

Technical Field

The disclosure relates to a touch technique, and particularly relates to a touch device capable of controlling turning on/off of a touch function, a control method thereof and a method for determining unlocking.

Related Art

Along with development of touch technology, touch devices gradually become basic equipment of electronic devices such as notebook computers, mobile phones, tablet PCs or portable multimedia players, etc., and gradually replace the conventional keyboards or physical keys to become input devices of a new generation.

However, in some usage situations, a user probably requires to temporarily turn off a touch function of a touch screen to avoid touch unconsciously. According to a conventional method, the touch function can be turned off through a hardware switch, though such method may increase a hardware cost of the electronic device. Particularly, regarding a large-scale touch screen, if the hardware switch of the touch function is configured, a configuration position of the hardware switch and circuit layout thereof have to be considered. Moreover, whether the switch is convenient in operation also influences a usage experience of the user.

SUMMARY

Accordingly, the disclosure is directed to a touch device, a control method thereof and a method for determining unlocking, by which a gesture of a user is still detected when the touch device is operated in a touch-lock mode, such that the user is capable of unlocking the touch clocking state through a specific gesture, so as to implement a more convenient touch switch operation.

The disclosure provides a touch device including at least two image capturing units and a processing unit. The image capturing units are respectively configured nearby a touch plane, where at least one light-reflected object is configured around the touch plane. The processing unit is coupled to the image capturing units, and the image capturing units emit a detecting signal along the touch plane, and the processing unit detects a reflected signal reflected from the detecting signal through the image capturing units. When the touch device is operated in a touch-lock mode, the processing unit detects the reflected signal through the image capturing units, so as to receive a first gesture performed on the touch plane, and determines whether the first gesture matches a first specific gesture, and when the first gesture matches the first specific gesture, the processing unit controls the touch device to operate in a touch-on mode. When the touch device is operated in the touch-on mode, the processing unit provides touch information, and when the touch device is operated in the touch-lock mode, the processing unit does not provide the touch information.

In an embodiment of the disclosure, the processing unit analyses the reflecting signal to obtain a number of a plurality of blocking points and a plurality of positions of the blocking points on the touch plane, so as to obtain the first gesture.

In an embodiment of the disclosure, the processing unit determines whether the number of the blocking points is within a specific range, and determines whether a first ratio between a distance between any two of the blocking points and a first side length of the touch plane is smaller than a first predetermined ratio, and determines whether a second ratio between the distance and a second side length of the touch plane is smaller than a second predetermined ratio, and the processing unit determines that the first gesture matches the first specific gesture when the number of the blocking points is within the specific range. The first ratio is smaller than the first predetermined ratio and the second ratio is smaller than the second predetermined ratio.

In an embodiment of the disclosure, when the touch device is operated in the touch-on mode, the processing unit further detects a second gesture performed on the touch plane through the image capturing units, and determines whether the second gesture matches a second specific gesture. When the second gesture matches the second specific gesture, the processing unit controls the touch device to operate in the touch-lock mode.

In an embodiment of the disclosure, the touch device further includes an indicator, which is used for indicating the touch-lock mode or the touch-on mode of the touch device.

The disclosure provides a control method of a touch device, where the touch device includes at least two image capturing units. The image capturing units are respectively configured nearby a touch plane, where at least one light-reflected object is configured around the touch plane. The control method includes following steps. The image capturing units are used to detect a reflected signal to receive a first gesture performed on the touch plane when the touch device is operated in a touch-lock mode, where the image capturing units emit a detecting signal along the touch plane, and detect the reflected signal reflected from the detecting signal. Then, it is determined whether the first gesture matches a first specific gesture, and when it is determined that the first gesture matches the first specific gesture, the touch device is made to operate in the touch-on mode. When the touch device is operated in the touch-on mode, the touch device provides touch information, and when the touch device is operated in the touch-lock mode, the touch device does not provide the touch information.

In an embodiment of the disclosure, the step of using the image capturing units to detect the reflected signal to receive the first gesture performed on the touch plane when the touch device is operated in the touch-lock mode includes the following steps: analysing the reflected signal to obtain a number of a plurality of blocking points and positions of the blocking points on the touch plane, so as to obtain the first gesture.

In an embodiment of the disclosure, the step of determining whether the first gesture matches the first specific gesture includes the following steps: determining whether the number of the blocking points is within a specific range; determining whether a first ratio between a distance between any two of the blocking points and a first side length of the touch plane is smaller than a first predetermined ratio; determining whether a second ratio between the distance and a second side length of the touch plane is smaller than a second predetermined ratio; and, determining that the first gesture matches the first specific gesture when the number of the blocking points is within the specific range, wherein the first ratio is smaller than the first predetermined ratio and the second ratio is smaller than the second predetermined ratio.

In an embodiment of the disclosure, the control method further includes the following steps: detecting a second gesture performed on the touch plane through the image capturing units when the touch device is operated in the touch-on mode; determining whether the second gesture matches a second specific gesture; and, making the touch device to operate in the touch-lock mode when the second gesture matches the second specific gesture.

In an embodiment of the disclosure, the touch device further includes an indicator, and the control method further includes the following steps: indicating the touch-lock mode or the touch-on mode of the touch device through the indicator.

The disclosure provides a method for determining unlocking, which is adapted to a touch device. The method for determining unlocking includes following steps. When the touch device is operated in a touch-lock mode and no image is displayed, a first gesture performed on a touch plane is detected. It is determined whether the first gesture matches a first specific gesture. When it is determined that the first gesture matches the first specific gesture, the touch device is made to operate in a touch-on mode. When the touch device is operated in the touch-on mode, touch information is provided, and when the touch device is operated in the touch-lock mode, the touch information is not provided.

In an embodiment of the disclosure, the touch device includes at least two image capturing units. The image capturing units are respectively configured nearby the touch plane, where at least one light-reflected object is configured around the touch plane. When the touch device is operated in the touch-lock mode and no image is displayed, the step of detecting the first gesture performed on the touch plane includes the following steps: using the image capturing units to emit a detecting signal along the touch plane, and detecting a reflected signal reflected from the detecting signal, so as to receive the first gesture performed on the touch plane.

In an embodiment of the disclosure, when the touch device is operated in the touch-lock mode and no image is displayed, the step of detecting the first gesture performed on the touch plane includes the following steps: analysing the reflected signal to obtain a number of a plurality of blocking points and positions of the blocking points on the touch plane, so as to obtain the first gesture.

In an embodiment of the disclosure, the step of determining whether the first gesture matches the first specific gesture includes the following steps: determining whether the number of the blocking points is within a specific range; determining whether a first ratio between a distance between any two of the blocking points and a first side length of the touch plane is smaller than a first predetermined ratio; determining whether a second ratio between the distance and a second side length of the touch plane is smaller than a second predetermined ratio; and, determining that the first gesture matches the first specific gesture when the number of the blocking points is within the specific range, wherein the first ratio is smaller than the first predetermined ratio and the second ratio is smaller than the second predetermined ratio.

In an embodiment of the disclosure, the method for determining unlocking further includes the following steps: detecting a second gesture performed on the touch plane through the image capturing units when the touch device is operated in the touch-on mode; determining whether the second gesture matches a second specific gesture; and, making the touch device to operate in the touch-lock mode when the second gesture matches the second specific gesture.

In an embodiment of the disclosure, the touch device further includes an indicator, and the method for determining unlocking further includes the following steps: indicating the touch-lock mode or the touch-on mode of the touch device through the indicator.

According to the above descriptions, in the touch device, the control method thereof and the method for determining unlocking of the disclosure, the gesture operation of the user is still detected when the touch device is operated in the touch-lock mode, and when the gesture of the user matches a specific gesture, the touch-lock mode of the touch device is unlocked, and the touch device is switched to the touch-on mode to turn on the touch function. In this way, the user can turn on/off the touch function through the gesture operation, so as to improve usage convenience of the touch device.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIGS. 2B-2D are examples of a reflected signal according to an embodiment of the disclosure.

FIGS. 5A-5I are examples of a reflected signal according to an embodiment of the disclosure.

DETAILED DESCRIPTION OF DISCLOSED EMBODIMENTS

In order to make a switch of a touch function of a touch device more convenient, the disclosure provides the touch device, a control method thereof and a method for determining unlocking, by which a gesture operation of the user can still be detected when the touch function of the touch device is turned off (in a touch-lock mode), and the touch function is turned on (a touch-on mode) when the gesture of the user matches a specific gesture. Thus, the user can turn on/off the touch function through the gesture operation, so as to improve usage convenience of the touch device.

Figure 1:
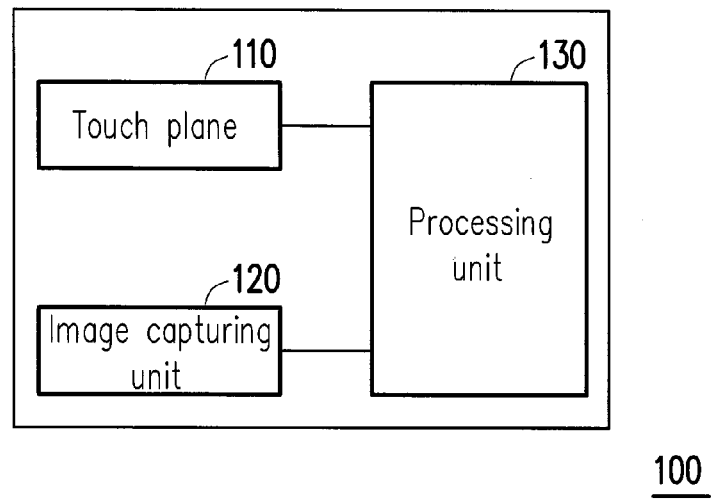
FIG. 1 is a block diagram of a touch device according to an embodiment of the disclosure.

FIG. 1 is a block diagram of a touch device according to an embodiment of the disclosure. Referring to FIG. 1, the touch device 100 includes a touch plane 110, at least two image capturing units (for example, image capturing units 120 in FIG. 1) and a processing unit 130. The touch device 100 is, for example, a capacitive, a resistive or an optical touch device, which is, for example, an electronic device (for example, a mobile phone, a tablet PC, a notebook computers, etc.) having a capacitive, a resistive or an optical touch module, and functions thereof are respectively described below.

The touch plane 110 is, for example, a liquid crystal display (LCD), an organic electro-luminescent display (OELD), or a projection display, etc. that has a touch function, which is adapted to apply a capacitive, a resistive, or an optical touch technique.

The image capturing units 120 are respectively disposed nearby the touch plane 110, and each of the image capturing units 120 may include a light source and an image capturing element. The light source is, for example, a laser generator such as a laser diode, a light-emitting diode (LED) or other suitable light-emitting elements, and the image capturing element is, for example, a complementary metal oxide semiconductor sensor (CMOS sensor) or a charge coupled device (CCD). The image capturing units 120 can emit a detecting signal along a surface of the touch plane 110 by using the light source, where the detecting signal is, for example, a visible light or an invisible light (for example, infrared). Then, the image capturing units 120 use the image capturing elements to capture an image of the surface of the touch plane 110 to detect a reflected signal reflected from the detecting signal emitted by the light source. The reflected signal is, for example, formed when the detecting signal is reflected by at least one light-reflected object configured around the touch plane 110, and the light-reflected object is, for example, a light-reflected frame.

The processing unit 130 is coupled to the touch plane 110 and the image capturing units 120. The processing unit 130 can be a central processing unit (CPU) or other programmable general purpose or special purpose microprocessor, a digital signal processor (DSP), a programmable controller, an application specific integrated circuit (ASIC) or other similar devices or a combination of the above devices. In the present embodiment, the processing unit 130 executes a gesture determination algorithm to identify user's gesture, and provides touch information corresponding to the gesture received through the image capturing units 120 when the touch function of the touch device 100 is turned on.

It should be noticed that in the present embodiment, the "touch-on mode" and the "touch-lock mode" of the touch device 100 may correspond to situations that the touch function of the touch device 100 is turned on and turned off. In detail, when the touch device 100 is operated in the touch-on mode, the processing unit 130 provides the touch information, and transmits the touch information to a system processor of the touch device 100, such that an operating system (for example, Windows, Linux, Android, Mac, etc.) of the touch device 100 can execute a related function according to the touch information. The touch information is, for example, a coordinate position of each blocking point on the touch plane 110 in the reflected signal, or a touch command corresponding to the gesture obtained by the processing unit 130 according to the gesture determination algorithm. When the touch device 100 is operated in the touch-lock mode, the processing unit 130 does not provide the aforementioned touch information, and only detects the reflected signal through the image capturing units 120 to obtain the number of the blocking points corresponding to the gesture and position information of each blocking point on the touch plane 110.

Figure 2A:
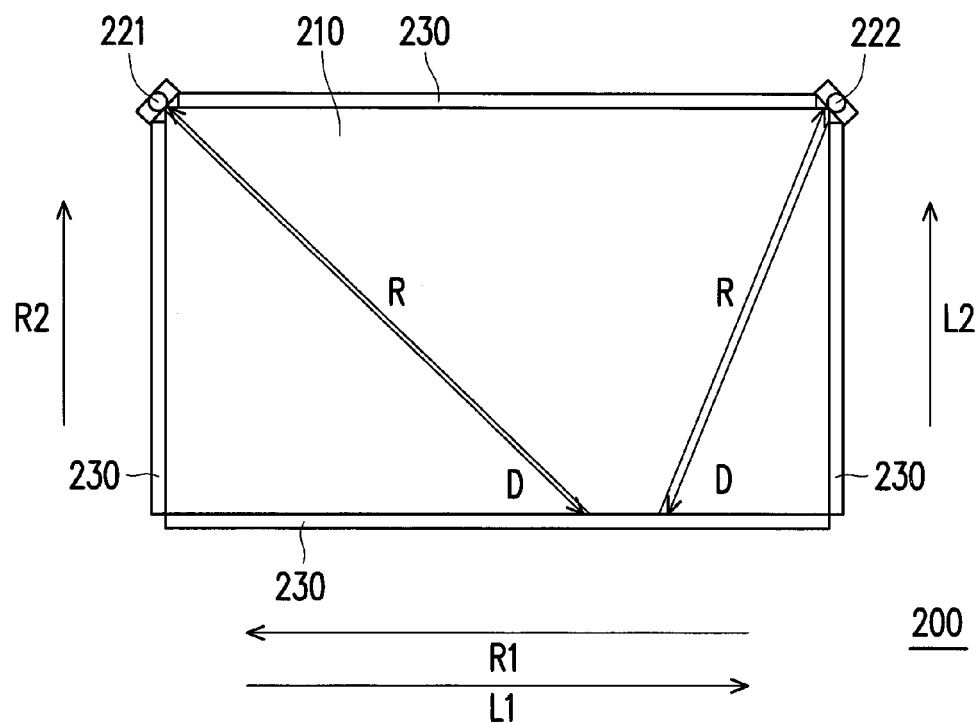
FIG. 2A is a schematic diagram of a touch device according to an embodiment of the disclosure.

The embodiments of FIGS. 2A-2D are provided below for further description. Referring to FIG. 2A, a touch device 200 includes a touch plane 210, image capturing units 221 and 222, a processing unit and light-reflected objects 230. In the present embodiment, the touch plane 210 is, for example, a rectangular touch plane, and the image capturing units 221 and 222 are respectively disposed at an upper left corner and an upper right corner of the touch plane 210, and the light-reflected objects 230 are disposed at four edges around the touch plane 210.

The image capturing units 221 and 222 respectively emit a detecting signal D along the surface of the touch plane 210, and the detecting signal D is reflected by the light-reflected object 230 to form a reflected signal R, and the image capturing units 221 and 222 respectively receive the reflected signal R. When the user performs an operation on the surface of the touch plane 210, and touch positions P1-P3 of the user's finger on the touch plane 210 are as that shown in FIG. 2D, the image capturing unit 221 can obtain a waveform diagram (shown in FIG. 2B) of the reflected signal R reflected along arrow directions L1 and L2 shown in FIG. 2A, and the image capturing unit 222 can obtain a waveform diagram (shown in FIG. 2C) of the reflected signal R reflected along arrow directions R1 and R2 shown in FIG. 2A. A waveform variation of the reflected signal R, for example, corresponds to brightness degrees of the signal. When the detecting signal D is reflected by the light-reflected object 230, the reflected signal R has higher brightness (for example, a signal point A of FIG. 2B, a signal point B of FIG. 2C). When the detecting signal D is intersected to the user's finger, the user's finger blocks the detecting signal D, such that the reflected signal R corresponding to the touch positions P1-P3 has lower brightness (for example, blocking points C1-C3 in FIG. 2B, and blocking points E1-E2 in FIG. 2C). The reflected signal R may include information such as the number of the blocking points and the coordinate positions of the blocking points on the touch plane 210, etc., and the processing unit can analyse the reflected signal R to learn the gesture operation of the user performed on the touch plane 210.

Figure 3:
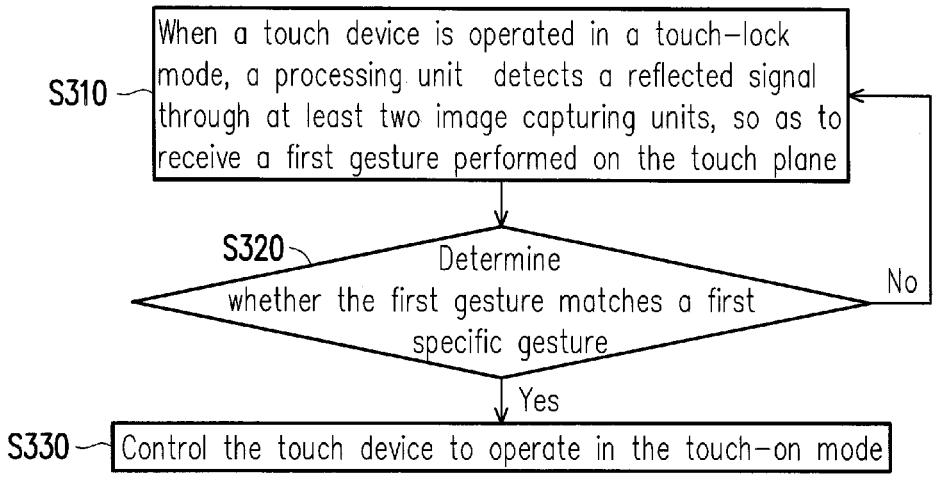
FIG. 3 is a flowchart illustrating a control method of a touch device according to an embodiment of the disclosure.

Based on the aforementioned device structure, the embodiment is provided below to describe a control method of the touch device. Referring to FIG. 3, FIG. 3 is a flowchart illustrating a control method of a touch device according to an embodiment of the disclosure, and the control method is adapted to the touch device 100 of FIG. 1. The control method is described in detail below with reference of various components of FIG. 1.

In step S310, when the touch device 100 is operated in the touch-lock mode, the processing unit 130 detects the reflected signal through the at least two image capturing units 120, so as to receive a first gesture performed on the touch plane 110. In detail, the processing unit 130 can analyse the reflected signal to obtain the number of a plurality of blocking points and positions of the blocking points on the touch plane 110, so as to obtain the first gesture.

Taking the reflected signals of FIG. 2B and FIG. 2C as an example, the processing unit 130 analyses the reflected signal, for example, takes a position where the brightness of the reflected signal is smaller than a threshold value as a blocking point, and calculates the number of the blocking points obtained by each of the image capturing units 120 (for example, three blocking points C1-C3 in FIG. 2B, and two blocking points E1-E2 in FIG. 2C), so as to obtain the three blocking points C1-C3 of the reflected signal, and accordingly calculates the touch positions P1-P3 of the blocking points C1-C3 on the touch plane 110.

Referring to the flow of FIG. 3, in step S320, the processing unit 130 determines whether the first gesture matches a first specific gesture, and when it is determined that the first gesture matches the first specific gesture, in step S330, the processing unit 130 controls the touch device 100 to operate in the touch-on mode. In detail, the first specific gesture can serve as a touch command for turning on the touch function of the touch device 100, which is, for example, a touch operation performed on the touch plane 110 through three fingers of user's single hand. Moreover, the first specific gesture can be a touch operation of four or five fingers or includes a plurality of gestures, which can be suitably set according to an actual design requirement, and is not limited by the disclosure.

Figure 4:
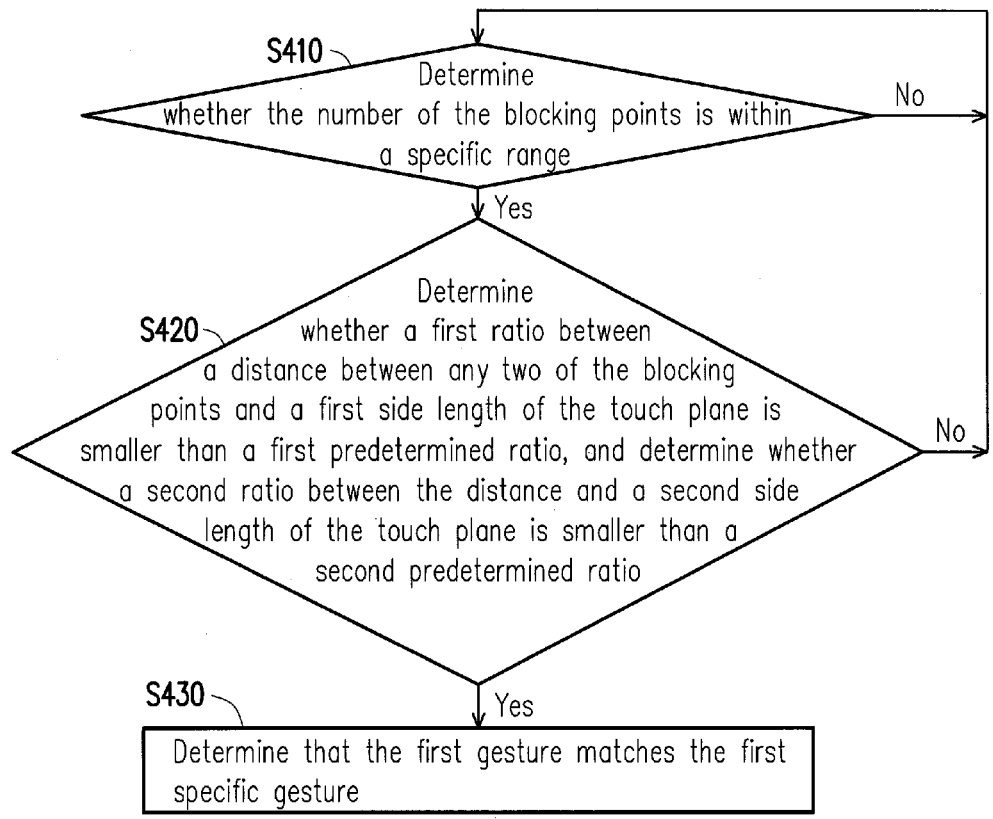
FIG. 4 is a flowchart illustrating a gesture determination algorithm according to an embodiment of the disclosure.

In following description, the first gesture is, for example, a gesture operation performed through 3 to 5 fingers of a single hand, and how the processing unit 130 determines whether the first gesture matches the first specific gesture according to a gesture determination algorithm is described below with reference of the flowchart of FIG. 4.

In step S410, the processing unit 130 determines whether the number of the blocking points is within a specific range. In detail, the specific range can be determined according the number of fingers corresponding to the first specific gesture, such that the specific range of the present embodiment can be set to 3 to 5 blocking points for identifying the gesture operation of the user. Moreover, since the number of fingers of the single hand is impossible to be greater than 5, a situation of more than 5 blocking points can be excluded according to the setting of the specific range.

Then, in order to determine whether a relative position between the blocking points is complied with a reasonable range that the user performs the gesture operation through a single hand, in step S420, the processing unit 130 determines whether a first ratio between a distance between any two of the blocking points and a first side length of the touch plane 110 is smaller than a first predetermined ratio, and determines whether a second ratio between the distance and a second side length of the touch plane 110 is smaller than a second predetermined ratio. The first side length and the second side length can be respectively a length and a width of the touch plane 110.

Therefore, according to determination conditions of the first specific gesture set according to the aforementioned gesture determination algorithm, when the number of the blocking points corresponding to the first gesture of the user is within the specific range, the first ratio is smaller than the first predetermined ratio, and the second ratio is smaller than the second predetermined ratio, in step S430, the processing unit 130 determines that the first gesture matches the first specific gesture.

Figures 5D, 5E, 5F:
Figures 5G, 5H, 5I:
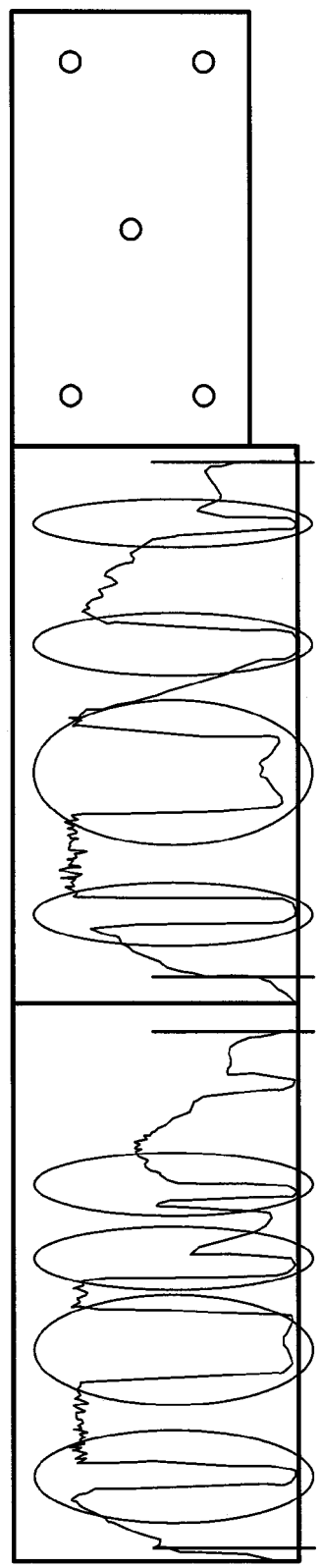

Taking a 65-inch screen with a length of 143 cm and a width of 80.9 cm as an example, the disclosure is described below with reference of FIG. 5A to FIG. 5I. FIGS. 5A, 5D, 5G and FIGS. 5B, 5E, 5H are respectively waveform diagrams of the reflected signal detected by each of the image capturing units 120 (for example, the image capturing units 221 and 222 of FIG. 2B) (referring to the embodiment of FIG. 2B and FIG. 2C for the detecting method of the reflected signal), and touch positions of blocking points of FIG. 5A and FIG. 5B on the touch plane 210 are shown in FIG. 5C, touch positions of blocking points of FIG. 5D and FIG. 5E on the touch plane 210 are shown in FIG. 5F, touch positions of blocking points of FIG. 5G and FIG. 5H on the touch plane 210 are shown in FIG. 5I. The processing unit 130 first determines whether the number of the blocking points matches the specific range. In the example of FIGS. 5A-5C and FIGS. 5G-5I, the number of the blocking points is 5, which matches the specific range. In the example of FIGS. 5D-5F, the number of the blocking points is 6, which does not match the specific range, i.e. the example of FIGS. 5D-5F does not match the characteristic of the gesture operation performed through 3 to 5 fingers of the single hand.

Moreover, since a covering length of a palm in a grabbing state is about 20 cm, the first predetermined ratio can be set to 20/143 and the second predetermined ratio can be set to 20/80.9. Therefore, the processing unit 130 calculates the ratios between the distance between any two of the blocking points and the length and the width of the screen to obtain the first ratio and the second ratio, and compares the first ratio with the first predetermined ratio, and compares the second ratio with the second predetermined ratio. Regarding the example of FIGS. 5G-5I, the distance between any to of the touch points is too large, such that the first ratio is greater than the first predetermined ratio or the second ratio is greater than the second predetermined ratio, and the processing unit 130 determines that the gesture operation shown in FIGS. 5G-5I is not complied with the gesture operation of the single hand. Regarding the example shown in FIGS. 5A-5C, the first ratio corresponding to the distance between any two of the blocking points is smaller than the first predetermined ratio, and the second ratio is smaller than the second predetermined ratio. Therefore, the gesture shown in FIG. 5A-5C is complied to the characteristic of the gesture operation performed through 3 to 5 fingers of the single hand, so that it is determined that the gesture matches the first specific gesture.

It should be noticed that determination criterions of the aforementioned gesture determination algorithm can be adjusted along with a setting of the first specific gesture. Moreover, an execution sequence of the determination criterions can be varied according to an actual requirement. Particularly, in some cases, a part of the determination steps can be omitted to simplify the determination flow (for example, when the size of the touch plane 110 is similar to the size of the user's palm, the step of determining the distance between the blocking points can be omitted), which is determined according to an actual design requirement.

In this way, when it is determined that the first gesture matches the first specific gesture, the processing unit 130 controls the touch device 100 to operate in the touch-on mode, so as to turn on the touch function. In other words, even if the touch device 100 is operated in the touch-lock mode and the touch function is turned off, the processing unit 130 of the present embodiment can still detect the gesture operation of the user performed on the touch plane 110, and when the gesture of the user matches the specific gesture used for turning on the touch function, the touch device 100 is controlled to operate in the touch-on mode, and the user can turn on the touch function through the gesture operation.

Moreover, according to the control method of the disclosure, the user can also turn off the touch function through the gesture operation, which is described below with reference of another embodiment.

Figure 6:
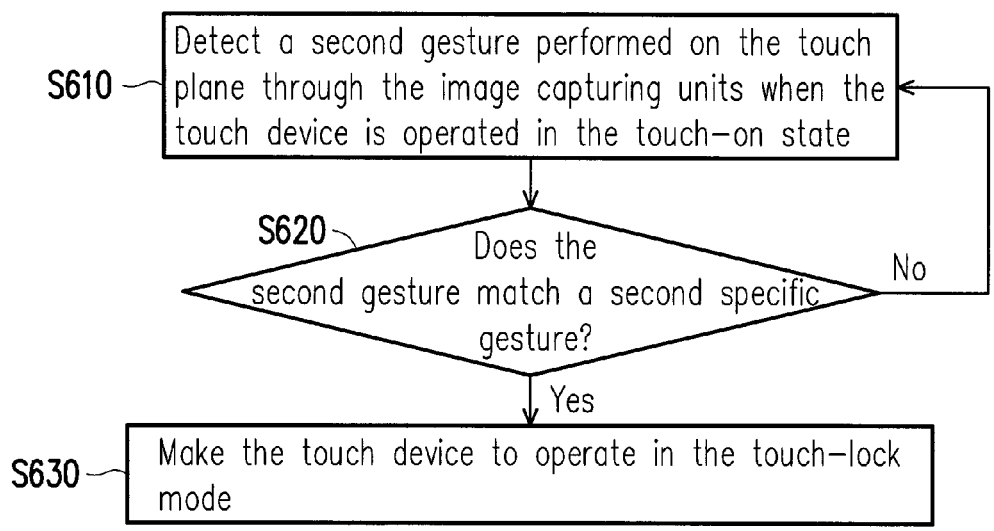
FIG. 6 is a flowchart illustrating a control method of a touch device according to an embodiment of the disclosure.

FIG. 6 is a flowchart illustrating a control method of a touch device according to an embodiment of the disclosure. The control method of the present embodiment is adapted to the touch device 100 of FIG. 1. Detailed steps of the control method are described below with reference of various components of FIG. 1. It should be noticed that the flow of FIG. 6 can be a continuation of the flow of FIG. 3, or can be executed before the flow of FIG. 3, which is determined according to an actual design requirement.

Referring to FIG. 6, when the touch device 100 is operated in the touch-on state, in step S610, the processing unit 130 detects a second gesture performed on the touch plane 110 through the image capturing units 120. In step S620, the processing unit 130 determines whether the second gesture matches a second specific gesture, and when the second gesture matches the second specific gesture, in step S630, the processing unit 130 controls the touch device 100 to operate in the touch-lock mode. In the present embodiment, the second specific gesture is, for example, a grab operation of 5 fingers on the touch plane 110, and through the grab operation or a user interface such as a control window activated by the grab operation, the operation mode of the touch device 100 is switched to the touch-lock mode. In other words, when the user performs the second gesture on the touch plane 110, the processing unit 130 can apply a gesture determination algorithm corresponding to the 5-finger grab operation (for example, determination criterions such as that the reflected signal includes 5 blocking points, the distance between any two of the blocking points is complied with the single hand covering length, etc.) to determine whether the second gesture of the user matches the aforementioned 5-finger grab operation. When the second gesture matches determination conditions of the second specific gesture, the processing unit 130 determines that the second gesture matches the second specific gesture, and controls the touch device 100 to operate in the touch-lock mode.

According to the above descriptions, the user can turn on or turn off the touch function of the touch device 100 only through the gesture operation, such that the touch device 100 is more convenient to operate.

In some embodiments, the touch device 100 may further include an indicator, and the indicator is, for example, a display panel or a light-emitting diode (LED). The processing unit 130 can indicate whether the display device 100 is in the touch-lock mode or the touch-on mode through the indicator, so as to notify the user whether the touch function of the touch device 100 is turned on or turned off.

It should be noticed that even if the touch device 100 is operated in the touch-lock state and no image is displayed, the touch device 100 of the disclosure can still detect the gesture operation of the user performed on the touch plane 110, and when the gesture of the user matches the specific gesture used for unlocking the touch-lock mode, the touch device 100 is controlled to operate in the touch-on mode to redisplay images. In other words, the embodiment of the disclosure provides a method for determining unlocking of the touch device, by which the user can unlock the touch-lock mode of the touch device 100 through a gesture operation, so as to provide a more convenient switching method of the touch function.

In summary, according to the touch device, the control method thereof and the method for determining unlocking of the disclosure, the gesture operation of the user is still detected when the touch device is operated in the touch-lock mode, and whether the gesture matches the specific gesture is determined according to the number of the blocking points corresponding to the gesture, and relative positions of the blocking points, etc., and when the gesture of the user matches the specific gesture, the touch-lock mode of the touch device is unlocked, and the touch device is switched to the touch-on mode to turn on the touch function. In this way, the user can turn on/off the touch function through the gesture operation, so as to improve usage convenience of the touch device.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A touch device, comprising:
    at least two image capturing units, respectively configured in different corners of a touch plane, wherein at least one light-reflected object is configured around the touch plane; and
    a processing unit, coupled to the at least two image capturing units, wherein the at least two image capturing units emit a detecting signal along the touch plane, and the processing unit detects a reflected signal reflected from the detecting signal through the image capturing units,
    wherein when the touch device is operated in a touch-lock mode, the processing unit detects the reflected signal through the at least two image capturing units, so as to receive a first gesture performed on the touch plane, and determines whether the first gesture matches a first specific gesture, and when the first gesture matches the first specific gesture, the processing unit controls the touch device to operate in a touch-on mode,
    wherein when the touch device is operated in the touch-on mode, the processing unit provides touch information, and when the touch device is operated in the touch-lock mode, the processing unit does not provide the touch information,
    wherein the processing unit analyses the reflecting signal to obtain a number of a plurality of blocking points and a plurality of positions of the blocking points on the touch plane, so as to obtain the first gesture, and
    wherein the processing unit determines whether the first gesture is performed by a single hand by determining whether a first ratio between a distance between any two of the blocking points and a first side length of the touch plane is smaller than a first predetermined ratio, determining whether a second ratio between the distance and a second side length of the touch plane is smaller than a second predetermined ratio, and determining whether the distance complies with a reasonable range performed by the single hand according to the first ratio and the second ratio, so as to determine whether the first gesture matches the first specific gesture.

2. The touch device as claimed in claim 1, wherein the processing unit further determines whether the number of the blocking points is within a specific range, so as to determine whether the first gesture matches the first specific gesture.

3. The touch device as claimed in claim 1, wherein when the touch device is operated in the touch-on mode, the processing unit further detects a second gesture performed on the touch plane through the at least two image capturing units, and determines whether the second gesture matches a second specific gesture, and when the second gesture matches the second specific gesture, the processing unit controls the touch device to operate in the touch-lock mode.

4. The touch device as claimed in claim 1, wherein the touch device further includes an indicator used for indicating the touch-lock mode or the touch-on mode of the touch device.

5. A control method of a touch device, wherein the touch device comprises at least two image capturing units, the at least two image capturing units are respectively configured in different corners of a touch plane, and at least one light-reflected object is configured around the touch plane, the control method comprising:

using the at least two image capturing units to detect a reflected signal to receive a first gesture performed on the touch plane when the touch device is operated in a touch-lock mode, wherein the at least two image capturing units emit a detecting signal along the touch plane, and detect the reflected signal reflected from the detecting signal;

determining whether the first gesture matches a first specific gesture; and making the touch device to operate in the touch-on mode when it is determined that the first gesture matches the first specific gesture, wherein when the touch device is operated in the touch-on mode, the touch device provides touch information, and when the touch device is operated in the touch-lock mode, the touch device does not provide the touch information, wherein the step of using the at least two image capturing units to detect the reflected signal to receive the first gesture performed on the touch plane when the touch device is operated in the touch-lock mode comprises:

analysing the reflected signal to obtain a number of a plurality of blocking points and a plurality of positions of the blocking points on the touch plane, so as to obtain the first gesture, and wherein the step of determining whether the first gesture matches the first specific gesture comprises:

determining whether the first gesture is performed by a single hand by determining whether a first ratio between a distance between any two of the blocking points and a first side length of the touch plane is smaller than a first predetermined ratio, determining whether a second ratio between the distance and a second side length of the touch plane is smaller than a second predetermined ratio, and determining whether the distance complies with a reasonable range performed by the single hand according to the first ratio and the second ratio, so as to determine whether the first gesture matches the first specific gesture.

6. The control method of the touch device as claimed in claim 5, wherein the step of determining whether the first gesture matches the first specific gesture further comprises:

determining whether the number of the blocking points is within a specific range, so as to determine whether the first gesture matches the first specific gesture.

7. The control method of the touch device as claimed in claim 5, further comprising:

detecting a second gesture performed on the touch plane through the at least two image capturing units when the touch device is operated in the touch-on mode;

determining whether the second gesture matches a second specific gesture; and making the touch device to operate in the touch-lock mode when the second gesture matches the second specific gesture.

8. The control method of the touch device as claimed in claim 5, wherein the touch device further comprises an indicator, and the control method further comprises:

indicating the touch-lock mode or the touch-on mode of the touch device through the indicator.

9. A method for determining unlocking, adapted to a touch device, the method for determining unlocking comprising:

detecting a first gesture performed on a touch plane when the touch device is operated in a touch-lock mode and no image is displayed;

determining whether the first gesture matches a first specific gesture; and making the touch device to operate in a touch-on mode when it is determined that the first gesture matches the first specific gesture, wherein when the touch device is operated in the touch-on mode, touch information is provided, and when the touch device is operated in the touch-lock mode, the touch information is not provided, when the touch device is operated in the touch-lock mode and no image is displayed, the step of detecting the first gesture performed on the touch plane comprises:

using at least two image capturing units to emit a detecting signal along the touch plane;

detecting a reflected signal reflected from the detecting signal, so as to receive the first gesture performed on the touch plane; and analysing the reflected signal to obtain a number of a plurality of blocking points and a plurality of positions of the blocking points on the touch plane, so as to obtain the first gesture, wherein the step of determining whether the first gesture matches the first specific gesture comprises:

determining whether the first gesture is performed by a single hand by determining whether a first ratio between a distance between any two of the blocking points and a first side length of the touch plane is smaller than a first predetermined ratio, determining whether a second ratio between the distance and a second side length of the touch plane is smaller than a second predetermined ratio, and determining whether the distance complies with a reasonable range performed by the single hand according to the first ratio and the second ratio, so as to determine whether the first gesture matches the first specific gesture.

10. The method for determining unlocking as claimed in claim 9, wherein the touch device comprises the at least two image capturing units, the at least two image capturing units are respectively configured in different corners of the touch plane, and at least one light-reflected object is configured around the touch plane.

11. The method for determining unlocking as claimed in claim 10, further comprising:

detecting a second gesture performed on the touch plane through the at least two image capturing units when the touch device is operated in the touch-on mode;

determining whether the second gesture matches a second specific gesture; and making the touch device to operate in the touch-lock mode when the second gesture matches the second specific gesture.

12. The method for determining unlocking as claimed in claim 9, wherein the step of determining whether the first gesture matches the first specific gesture further comprises:

determining whether the number of the blocking points is within a specific range, so as to determine whether the first gesture matches the first specific gesture.

13. The method for determining unlocking as claimed in claim 9, wherein the touch device further comprises an indicator, and the method for determining unlocking further comprises:

indicating the touch-lock mode or the touch-on mode of the touch device through the indicator.

* * * * *